United States Patent [19]
Miller et al.

[11] Patent Number: 6,145,321
[45] Date of Patent: Nov. 14, 2000

[54] METHOD AND APPARATUS FOR COOLING AN AQUEOUS LIQUID

[75] Inventors: Jeremy Paul Miller, Mortimer; Mark Sherman Williams, Winchester, both of United Kingdom

[73] Assignee: Air Products and Chemicals, Inc., Allentown, Pa.

[21] Appl. No.: 09/348,537

[22] Filed: Jul. 7, 1999

[30] Foreign Application Priority Data

Jul. 13, 1998 [GB] United Kingdom ............... 9814970

[51] Int. Cl.[7] .................................................. F17C 3/10
[52] U.S. Cl. ................... 62/48.2; 62/100; 62/116; 62/268; 62/500
[58] Field of Search ............... 62/100, 268, 116, 62/500, 48.2

[56] References Cited

U.S. PATENT DOCUMENTS 3,733,838  5/1973  Delahunty ................... 62/48.2
3,800,550  4/1974  Delahunty ................... 62/116
4,748,817  6/1988  Oura et al. ................... 62/116

*Primary Examiner*—Ronald Capossela
*Attorney, Agent, or Firm*—Robert J. Wolff

[57] ABSTRACT

A method of cooling an aqueous liquid, which method comprises the steps of:

a) placing said aqueous liquid in a vessel;

b) reducing the pressure in said vessel to cause said aqueous liquid to boil;

c) condensing at least some of the liquid in the vapour created as said aqueous liquid boils by heat exchange with a liquid cryogen; and d) using vapour from said liquid cryogen to at least assist in step (b).

16 Claims, 5 Drawing Sheets

WATER VAPOUR PRESSURE

METHOD AND APPARATUS FOR COOLING AN AQUEOUS LIQUID

FIELD OF THE INVENTION

This invention relates to a method and apparatus for cooling an aqueous liquid and, more particularly but not exclusively, is concerned with a method and apparatus for cooling sauces.

BACKGROUND OF THE INVENTION

With the advent of the working family it is becoming increasingly common for families to rely on pre-prepared meals. The quality of such meals has improved immensely over the last 20 years and many such meals are now competing in quality with good restaurant food.

One of the features which has distinguished the best restaurant food from pre-prepared dishes is the quality of the sauces.

Whilst it is possible to prepare excellent sauces in large batches the subsequent cooling and reheating processes tend to dull the subtle flavours and aromatics that accompany a fine newly prepared sauce.

Various cooling techniques are currently used to help retain the quality of the sauce. The most satisfactory of these methods are described with reference to FIGS. 1 and 2 hereto. The disadvantage of these are that the associated apparatus is relatively capital intensive and has a substantial number of working parts which require regular maintenance.

SUMMARY OF THE PRESENT INVENTION

In its basic form the present invention provides a simple, relatively inexpensive alternative ideally suited for the smaller factory. According to the present invention there is provided a method of cooling an aqueous liquid, which method comprises the steps of:

a) placing said aqueous liquid in a vessel;
b) reducing the pressure in said vessel to cause said aqueous liquid to boil;
c) condensing at least some of the liquid in the vapour created as said aqueous liquid boils by heat exchange with a liquid cryogen; and
d) using vapour from said liquid cryogen to at least assist in step (b).

Preferably, said method includes the step of returning condensate from step (c) to said aqueous liquid in said vessel.

Advantageously, said aqueous liquid is an edible sauce.

The present invention also provides an apparatus for cooling an aqueous liquid, which apparatus comprises:

a) a vessel to hold said aqueous liquid;
b) pressure reducing means to reduce the pressure in said vessel;
c) a heat exchanger for bringing, in use, a coolant into indirect heat exchange with the vapour created as said aqueous liquid boils in said vessel to condense at least part thereof;
(d) means to introduce a liquid cryogen into said heat exchanger; and
(e) means which, in use, will enable vapour from said liquid cryogen to at least assist in operating said pressure reducing means.

In one embodiment said pressure reducing means comprises a vacuum pump.

In another embodiment said pressure reducing means comprises an eductor.

Preferably, said pressure reducing means comprises a plurality of eductors connected in cascade.

Advantageously, said apparatus includes a first temperature sensor adapted to generate a signal indicative of the temperature of aqueous liquid in said vessel, a second temperature sensor adapted to generate a signal indicative of the temperature of gaseous cryogen leaving said heat exchanger, a control valve adapted to control the flow of cryogenic liquid to said heat exchanger, and control means responsive to the difference between the signals from said first and second temperature sensors to open and close said control valve so that the temperature difference between the aqueous liquid in said vessel and the cryogenic vapour leaving said heat exchanger is substantially constant.

Preferably, said heat exchanger is disposed inside said vessel. However, this is not essential.

In one embodiment, said heat exchanger is disposed above said vessel and a pipe is provided so that, in use, condensate formed in said heat exchanger can flow back into said vessel.

According to another aspect of the present invention there is provided and apparatus for cooling an aqueous liquid, which apparatus comprises:

a) a vessel to hold said aqueous liquid;
b) pressure reducing means to reduce the pressure in said vessel;
c) a heat exchanger for bringing, in use, a coolant into indirect heat exchange with the vapour created as said aqueous liquid boils in said vessel to condense at least part thereof;
(d) means to introduce a liquid cryogen into said heat exchanger;
(e) means which, in use, will enable vapour from said liquid cryogen to at least assist in operating said pressure reducing means;
(f) a first temperature sensor adapted to generate a signal indicative of the temperature of aqueous liquid in said vessel;
(g) a second temperature sensor adapted to generate a signal indicative of the temperature of gaseous cryogen leaving said heat exchanger;
(h) a control valve adapted to control the flow of cryogenic liquid to said heat exchanger; and
(i) control means responsive to the difference between the signals from said first and second temperature sensors to open and close said control valve whereby the temperature difference between the aqueous liquid in said vessel and the cryogenic vapour leaving said heat exchanger is substantially constant.

In one embodiment, said pressure reducing means comprises a vacuum pump.

In another embodiment, said pressure reducing means comprises an eductor.

Advantageously, said pressure reducing means comprises a plurality of eductors connected in cascade.

Preferably, said heat exchanger is disposed inside said vessel. However, this is not essential.

In another embodiment said heat exchanger is disposed above said vessel and a pipe is provided so that, in use, condensate formed in said heat exchanger can flow back into said vessel.

For a better understanding of the present invention reference will now be made, by way of example, to the accompanying drawings, in which:

DESCRIPTION OF THE PRIOR ART

Figure 1:
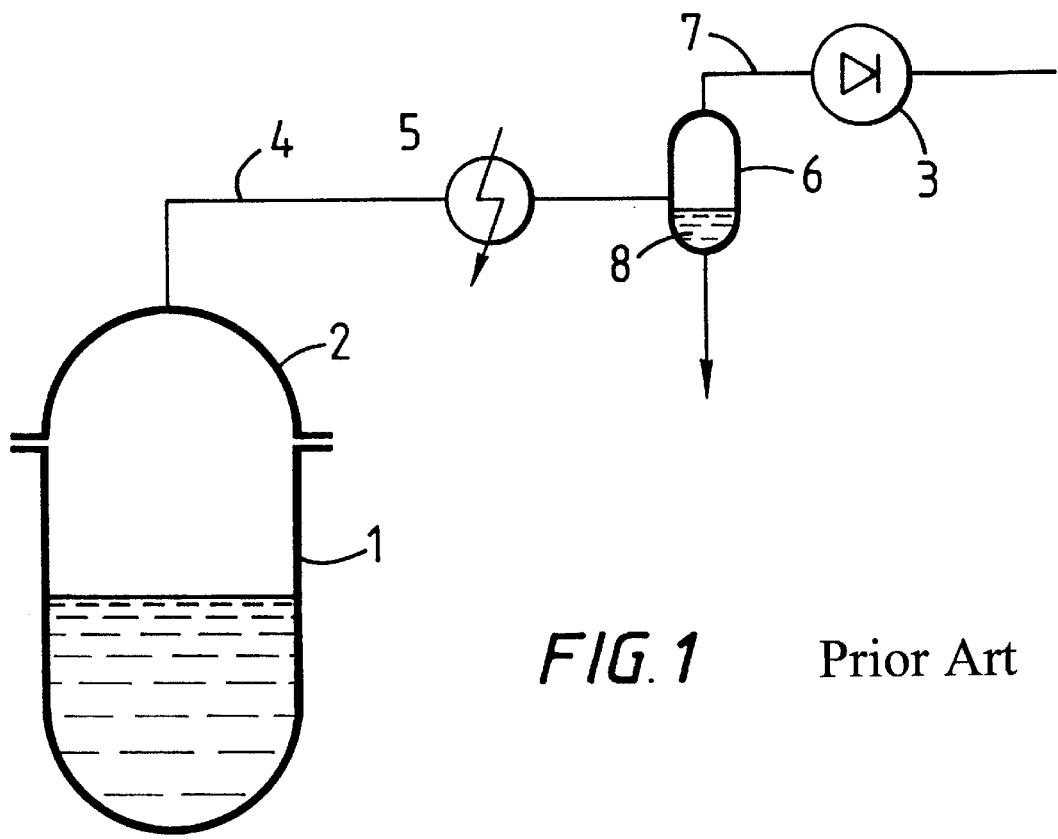
FIG. 1 is a flow sheet showing a first embodiment of a prior art apparatus for cooling foodstuffs.

Referring to FIG. 1 a sauce is prepared and introduced into a vessel 1 at about 90° C. The vessel 1 is covered with a lid 2 and a vacuum is applied via vacuum pump 3.

As the pressure in the vessel 1 falls the sauce begins to boil and part of the liquid turns to vapour. The energy required for vaporization comes from the sauce which becomes progressively colder as the pressure drops.

The vapour itself leaves the vessel 1 through pipe 4. Because of its high water content (not to mention innumerable other organics) it is highly undesirable that this vapour should be introduced into the vacuum pump 3. As such it is usually passed through a heat exchanger where it is indirectly cooled by cold refrigerant (typically brine) from a mechanical refrigeration system. Any condensate is recovered in phase separator 6 whilst the residual gas passes through pipe 7 to the vacuum pump 3.

The disadvantage of this apparatus is that the capacity of the vacuum pump 3 is usually relatively small so that it takes a significant time to evacuate the vessel 1. Furthermore, the independent mechanical refrigeration system is expensive to install and requires routine maintenance.

The condensate 8, which is usually predominantly water, is normally discarded. It has been proposed to return the condensate to the sauce after the cooling cycle has been completed. However, this simply does not seem to return the sauce to its original quality, possibly due to the inability to distribute the condensate uniformly throughout the sauce which is usually quite viscous at low temperatures. Another possibility is that some of the organics responsible for flavour and aromatics are not condensed and pass through the pump 3 to atmosphere.

Figure 2:
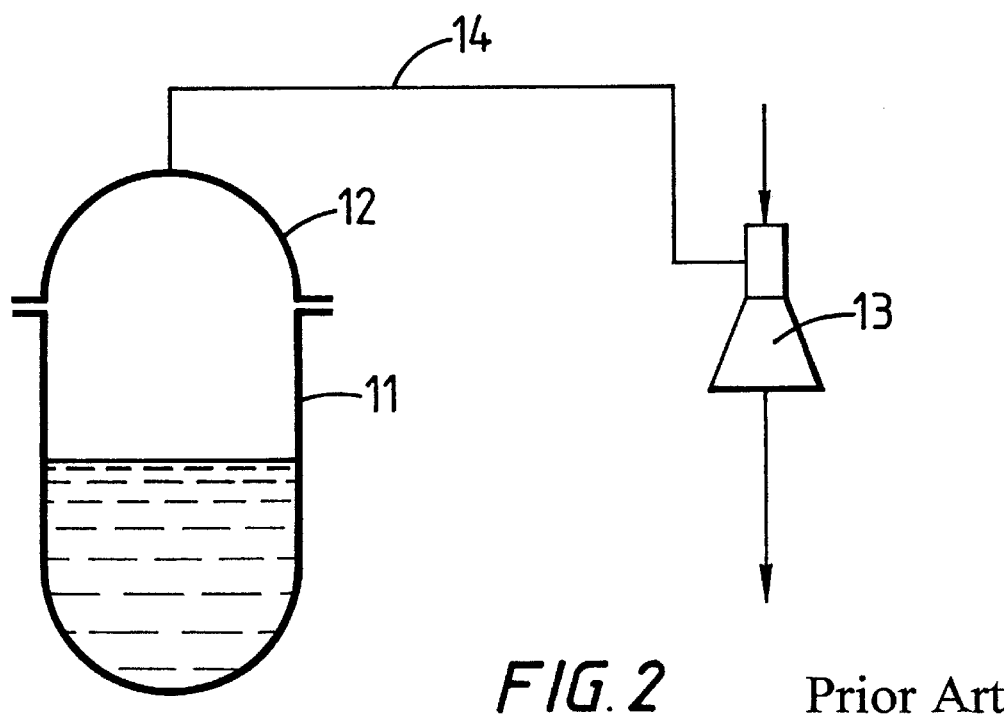
FIG. 2 is a flow sheet showing a second embodiment of a prior art apparatus for cooling foodstuffs.

Turning now to FIG. 2 there is shown an alternative prior art apparatus. The apparatus comprises a vessel 11 having a lid 12.

In use sauce at 90° C. is introduced into the vessel 11 and the lid is secured thereto. A vacuum is then applied via a pipe 14 by passing steam through an eductor 13.

The eductor 13 takes the place of the pump 3 in the embodiment shown in FIG. 1. The advantage of the apparatus is that the eductor has a significantly greater output at low vacuum and can thus rapidly initially depressurise the vessel 1. Furthermore the mechanical refrigeration system for condensing the volatiles can be dispensed with. The disadvantages are the cost of providing and running a steam generating plant and condensing and cooling the vapour leaving the eductor 13. Furthermore, any organics in the vapour from the sauce are lost in the steam.

DETAILED DESCRIPTION OF THE PREFERRED EMBODIMENTS

Figure 3:
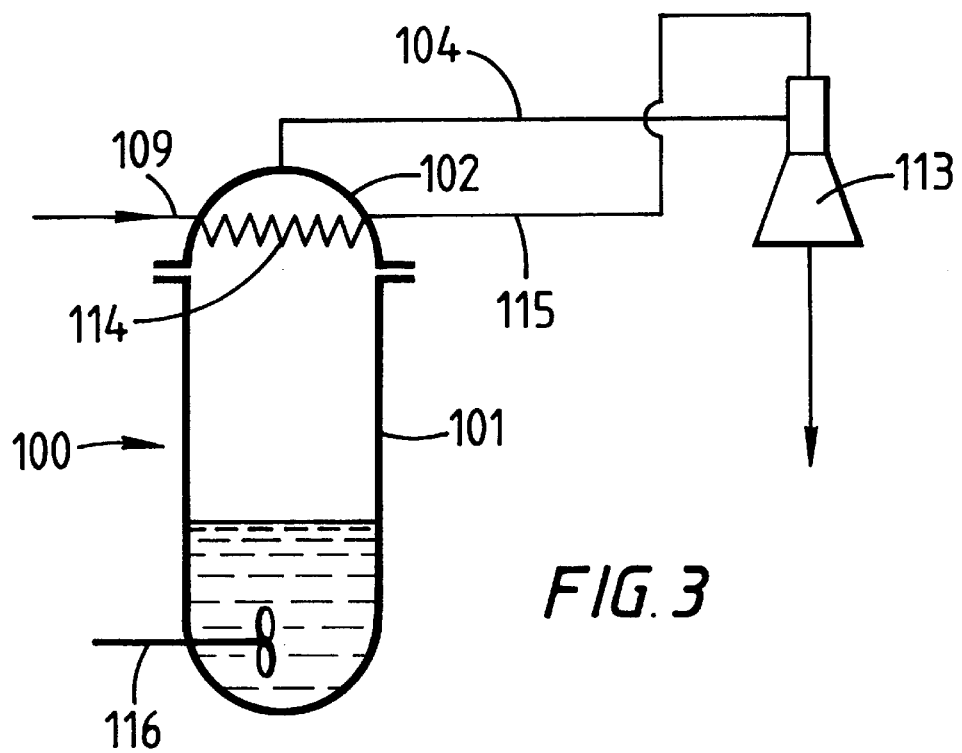
FIG. 3 is a flow sheet showing a first embodiment of an apparatus in accordance with the present invention.

Referring now to FIG. 3 there is shown an apparatus which is generally identified by the reference numeral 100.

The apparatus 100 comprises a vessel 101 provided with a lid 102. A pipe 104 extends from the lid 102 to an eductor 113.

A pipe 109 is arranged to deliver liquid nitrogen to a heat exchanger 114 disposed in the lid 102. A pipe 115 is arranged to carry gaseous nitrogen from the heat exchanger 114 to the eductor 113.

In use, a sauce at 90° C. is introduced into the vessel 101 which is then closed with the lid 102. Liquid nitrogen is then introduced into the heat exchanger 114 where it evaporates. The gaseous nitrogen produced passes through pipe 115 and eductor 113 where it starts reducing the pressure in the vessel 101. As the pressure in the vessel 101 drops the sauce starts boiling and vapour is formed. As the vapour rises it encounters the heat exchanger 114 which condenses the volatiles, i.e. the water vapour and organics.

It will be appreciated that as the sauce evaporates the energy required to provide the refrigeration results in the sauce cooling. Conversely, as the vapour reaches the heat exchanger 114 the energy adsorbed during evaporation is used to evaporate the liquid nitrogen in the evaporator 114 whilst the vapour condenses. The result is that very little of the volatile organics responsible for the aromatics and flavours of the sauce ever leave the vessel 1 and the continuous evaporation/condensation process helps ensure a homogeneous sauce. A paddle 116 is preferably provided to continuously stir the sauce.

Various modifications to the apparatus shown in FIG. 3 are envisaged. For example a vacuum pump similar to vacuum pump 3 could also be connected to the vessel 101. The purpose of such a vacuum pump would be to take over from the eductor 113 once it had reduced the pressure in vessel 101 as far as possible. In this connection it will be understood that eductors 113 can only provide a limited vacuum and it may be desirable once this pressure has been reached to isolate the eductor 113 and further reduce the pressure in the vessel 101 with the vacuum pump. If confined to such duty it is anticipated that the mechanical refrigeration unit and phase separator could be dispensed with. In passing, it should be noted that the volume of liquid nitrogen used for condensation provides a more than adequate flow of gaseous nitrogen for driving the eductor.

Eductors tend to be designed either to have a high throughput with a modest reduction in pressure or a lower throughput with a higher reduction of pressure. For this reason it is anticipated that rather than a single eduction a commercial installation would use two or more eductors with different properties arranged in cascade to achieve a high eventual vacuum.

Figure 4:
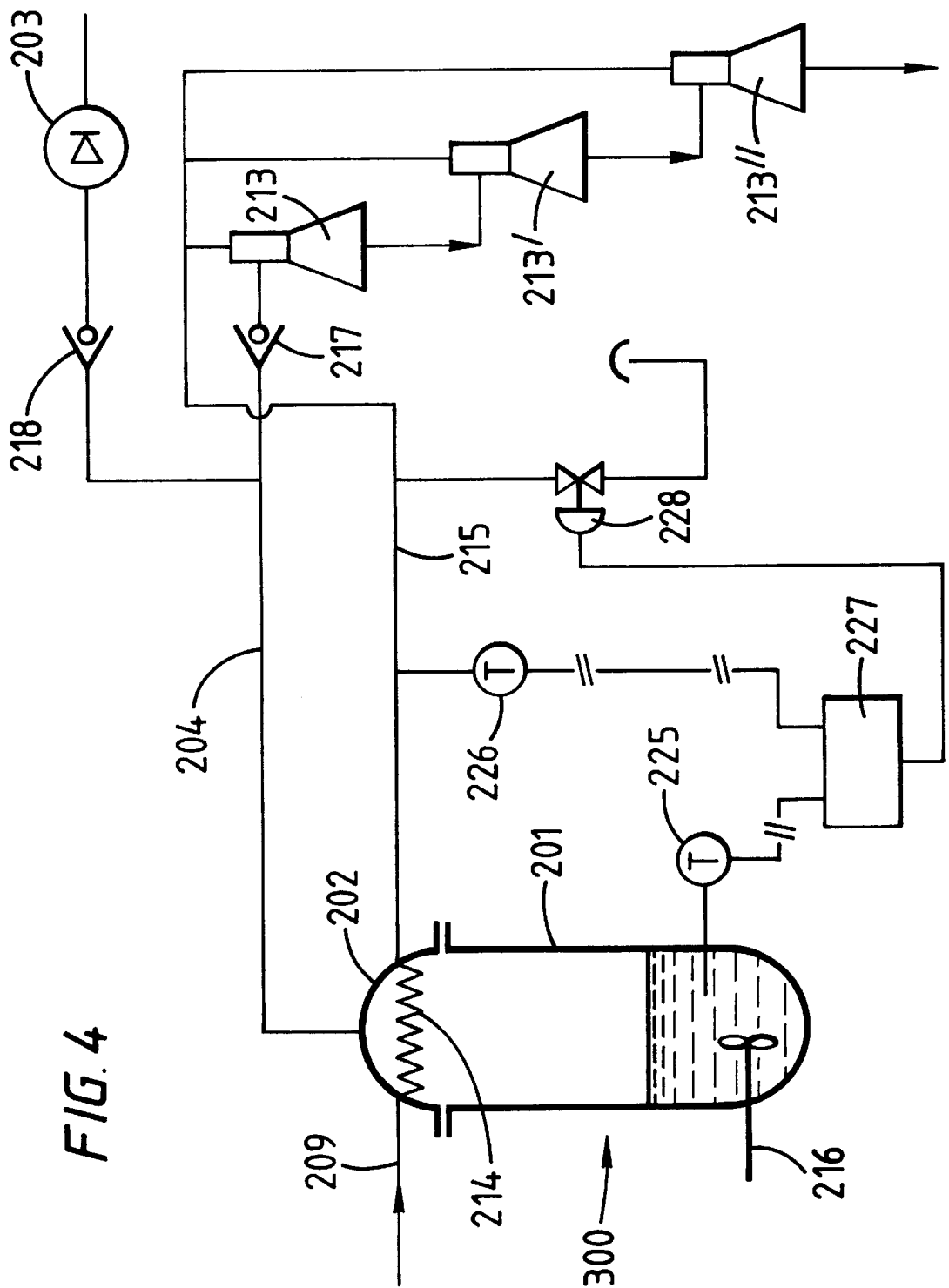
FIG. 4 is a flow sheet showing a second embodiment of an apparatus in accordance with the present invention.

Such an apparatus is shown in FIG. 4 where parts having a similar function to parts in FIG. 3 have been given the same reference number in the "200" series.

It will be noted that the eductor 113 has been replaced by three eductors 213, 213' and 213" arranged in cascade and vacuum pump 203 has been provided. Non return valves 217 and 218 have been provided where indicated. These may be conveniently formed by electrically controlled solenoid valves.

Eductor 213 is a high pumping capacity coarse vacuum ejector whose main function is to rapidly remove air from the headspace in the vessel 201 and maintain vapour pressure in the early part of the cooling cycle as air degasses from the sauce.

Eductors 213' and 213" are low capacity, high vacuum ejectors capable of removing air and/or non condensables at pressure as low as 8 mbar, (which corresponds to a sauce temperature of about 4° C.). The vacuum pump 203 is a prudent safety measure and adds additional pumping capacity and the ability to provide a lower pressure than the eductors should this be required.

In use, the eductors 213, 213' and 213" are used to progressively reduce the pressure in vessel 201 to about 8 mbar. If the rate of pressure reduction is not acceptable vacuum pump 203 is activated to assist in reducing the pressure to about 8 mbar at which pressure a typical sauce will boil at 4° C.

The eductors 213, 213' and 213" are preferably activated so that initially only eductor 213 is active. Later, when the vapour pressure reaches about 450 mbar eductor 213' is activated in parallel with eductor 213. When the pressure reaches about 300 mbar the supply of nitrogen to eductor 213 is closed off using a control valve (not shown).

When pressure reaches 32 mbar eductor 213" is brought on stream in parallel with eductor 213'.

When the pressure reaches about 10 mbar the supply of nitrogen to eductor 213' is terminated leaving eductor 213" to bring the pressure down to 8 mbar (with or without the assistance of vacuum pump 203).

Figure 7:
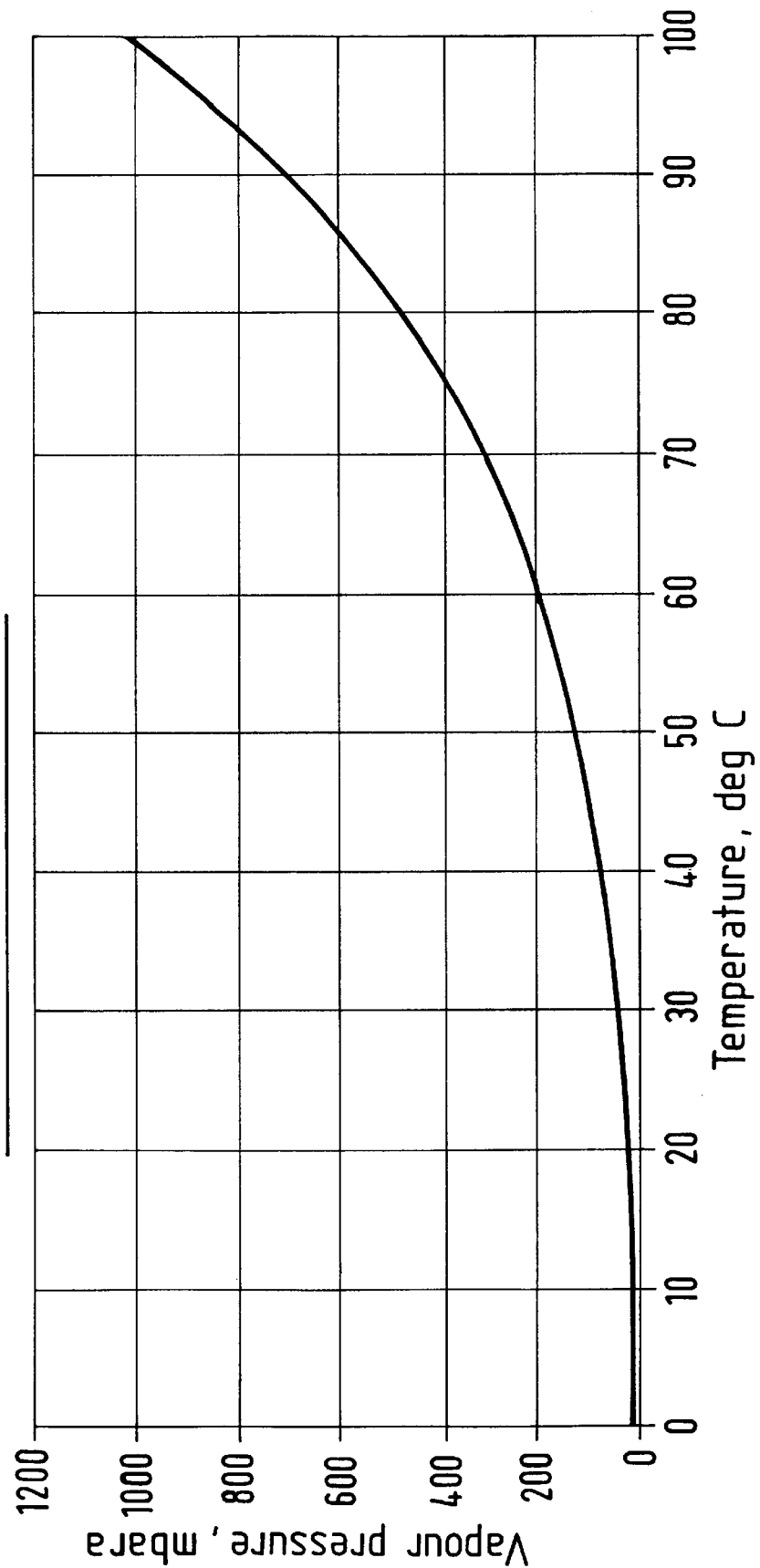
FIG. 7 is a graph showing how the boiling point of a typical sauce varies with pressure.

A typical curve showing the boiling point of a sauce against pressure is shown in FIG. 7.

After the sauce has been cooled it is removed from the vessel 201 which is sterilized in preparation for the next batch of sauce. If desired the vessel 201 could be provided with a permanent outlet pipe in the bottom thereof and the lid 202 provided with a permanent inlet pipe.

Whilst operating a test apparatus in accordance with FIG. 4 it was noted that the rate of cooling from 90° C. to the desired 5° C. was substantially constant. In the prior art the rate of cooling diminished significantly as the sauce approached 5° C. This was attributed to the use of liquid nitrogen and the large difference in temperature between the liquid nitrogen (−196° C.) and the sauce (90° C. to 5° C.). However, the sauce did not freeze nor was any ice visible on the surface of the evaporator 114.

The use of the paddle 216 appears to have significant beneficial effect and it is postulated that this inter alia helped release bubbles of air entrapped in the sauce during its preparation.

Design considerations for the heat exchanger 214 include ensuring that ice does not form on the surface of the heat exchanger 214. It may also be desirable to control the flow of liquid nitrogen to the heat exchanger 214 in such a way that there is a constant temperature differential between the vapour leaving the heat exchanger 214 and the sauce. For economic operation this could be set as low as 5° C. although 10° C. is recommended. Such a control system could be effected by a temperature sensor 225 in the sauce, a temperature sensor 226 in the vapour stream leaving the heat exchanger 214, and a control unit 227 arranged to open and close a control valve 228 to control the flow of liquid nitrogen through the heat exchanger 214. The control valve 228 vents to atmosphere as shown.

Typically, sauces are made commercially in 500 kg batches and the UK code of good practice requires them to be cooled to between 5° C. and 8° C. within 90 minutes.

Whilst liquid nitrogen is preferred, other liquid cryogens could also be used, for example liquid air, a nitrogen rich mixture of liquid oxygen and liquid nitrogen, liquid argon or liquid helium. However, liquid nitrogen is much preferred.

Whilst it is preferred to locate the heat exchanger 214 in the vessel 201 it could be located in a separate vessel above the vessel 201 and arranged to return condensate directly to the vessel 201 in a similar manner to a condenser on a distillation column. Such a heat exchanger could, if desired, be provided with packing or plates in a similar manner to a distillation column. However, cleaning considerations probably make such an embodiment impractical.

Figure 5:
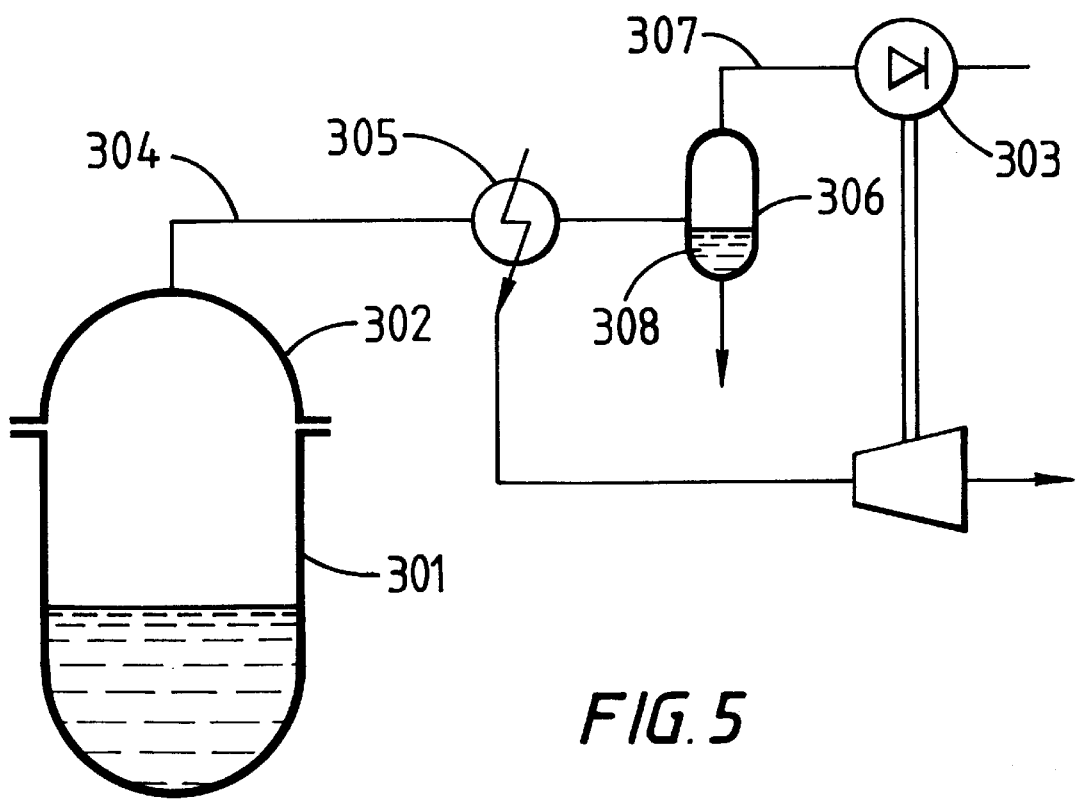
FIG. 5 is a flow sheet showing a third embodiment of an apparatus in accordance with the present invention.

Whilst the primary aim of the present invention was to produce a higher quality sauce the applicants also realised that the previous solutions could be improved. Thus, FIG. 5 shows an apparatus which is generally similar to that shown in FIG. 1 except that the heat exchanger 305 is cooled with liquid nitrogen and the vaporized nitrogen leaving the heat exchanger 305 is used to drive the vacuum pump 303. The remaining parts of the apparatus correspond to parts used in the embodiment of FIG. 1 and parts having similar functions have been identified by similar reference numerals but in the "300" series.

Figure 6:
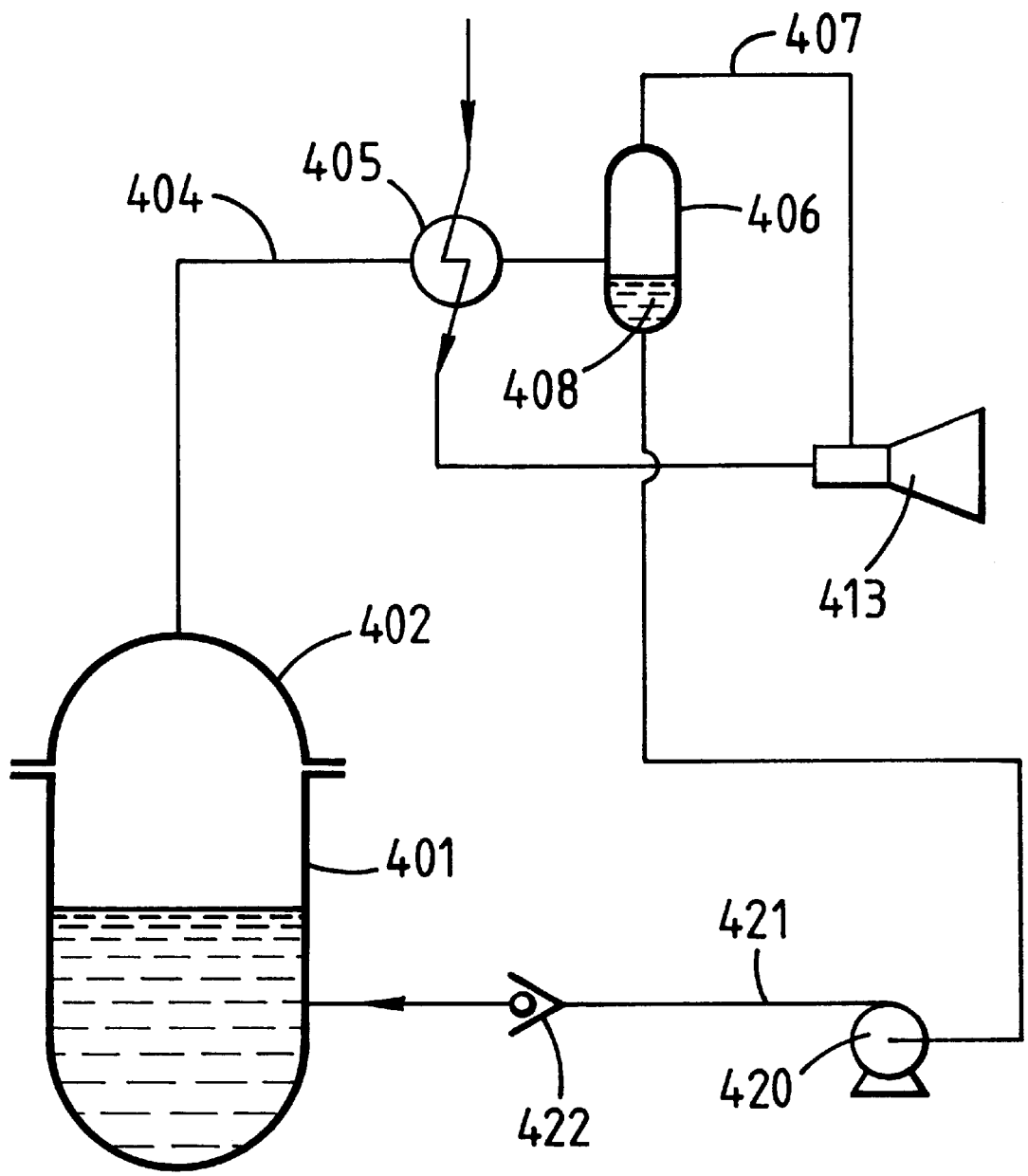
FIG. 6 is a flow sheet showing a fourth embodiment of an apparatus in accordance with the present invention.

FIG. 6 shows a variation of the apparatus shown in FIG. 5. In this apparatus the heat exchanger 405 is cooled by liquid nitrogen. The gaseous nitrogen leaving the heat exchanger is directed into an eductor 413. A small pump 420 is provided to return condensate from the phase separator 406 to the vessel 401 via pipe 421 and non-return valve 422.

What is claimed is:

1. A method of cooling an aqueous liquid, which method comprises the steps of:
    a) placing said aqueous liquid in a vessel;
    b) reducing the pressure in said vessel to cause said aqueous liquid to boil;
    c) condensing at least some of the liquid in the vapour created as said aqueous liquid boils by heat exchange with a liquid cryogen; and
    d) using vapour from said liquid cryogen to at least assist in step (b).

2. A method according to claim 1, including the step of returning condensate from step (c) to said aqueous liquid in said vessel.

3. A method according to claim 1, wherein said aqueous liquid is an edible sauce.

4. An apparatus for cooling an aqueous liquid, which apparatus comprises:
    a) a vessel to hold said aqueous liquid;
    b) pressure reducing means to reduce the pressure in said vessel;
    c) a heat exchanger for bringing, in use, a coolant into indirect heat exchange with the vapour created as said aqueous liquid boils in said vessel to condense at least part thereof;
    (d) means to introduce a liquid cryogen into said heat exchanger; and
    (e) means which, in use, will enable vapour from said liquid cryogen to at least assist in operating said pressure reducing means.

5. An apparatus as claimed in claim 4, wherein said pressure reducing means comprises a vacuum pump.

6. An apparatus as claimed in claim 4, wherein said pressure reducing means comprises an eductor.

7. An apparatus as claimed in claim 6, wherein said pressure reducing means comprises a plurality of eductors connected in cascade.

8. An apparatus as claimed in claim 4, including a first temperature sensor adapted to generate a signal indicative of the temperature of aqueous liquid in said vessel, a second temperature sensor adapted to generate a signal indicative of the temperature of gaseous cryogen leaving said heat exchanger, a control valve adapted to control the flow of cryogenic liquid to said heat exchanger, and control means responsive to the difference between the signals from said first and second temperature sensors to open and close said control valve so that the temperature difference between the aqueous liquid in said vessel and the cryogenic vapour leaving said heat exchanger is substantially constant.

9. An apparatus as claimed in claim 4, wherein said heat exchanger is disposed inside said vessel.

10. An apparatus as claimed in claim 4, wherein said heat exchanger is disposed above said vessel and a pipe is provided so that, in use, condensate formed in said heat exchanger can flow back into said vessel.

11. An apparatus for cooling an aqueous liquid, which apparatus comprises:
  a) a vessel to hold said aqueous liquid;
  b) pressure reducing means to reduce the pressure in said vessel;
  c) a heat exchanger for bringing, in use, a coolant into indirect heat exchange with the vapour created as said aqueous liquid boils in said vessel to condense at least part thereof;
  (d) means to introduce a liquid cryogen into said heat exchanger;
  (e) means which, in use, will enable vapour from said liquid cryogen to at least assist in operating said pressure reducing means;
  (f) a first temperature sensor adapted to generate a signal indicative of the temperature of aqueous liquid in said vessel;
  (g) a second temperature sensor adapted to generate a signal indicative of the temperature of gaseous cryogen leaving said heat exchanger;
  (h) a control valve adapted to control the flow of cryogenic liquid to said heat exchanger; and
  (i) control means responsive to the difference between the signals from said first and second temperature sensors to open and close said control valve whereby the temperature difference between the aqueous liquid in said vessel and the cryogenic vapour leaving said heat exchanger is substantially constant.

12. An apparatus as claimed in claim 11, wherein said pressure reducing means comprises a vacuum pump.

13. An apparatus as claimed in claim 11, wherein said pressure reducing means comprises an eductor.

14. An apparatus as claimed in claim 11, wherein said pressure reducing means comprises a plurality of eductors connected in cascade.

15. An apparatus as claimed in claim 11, wherein said heat exchanger is disposed inside said vessel.

16. An apparatus as claimed in claim 11, wherein said heat exchanger is disposed above said vessel and a pipe is provided so that, in use, condensate formed in said heat exchanger can flow back into said vessel.

* * * * *